United States Patent
Tamura et al.

(10) Patent No.: US 6,545,072 B2
(45) Date of Patent: *Apr. 8, 2003

(54) POLYPROPYLENE RESIN COMPOSITION, AND FILM AND SHEET USING THE SAME

(75) Inventors: Satoshi Tamura, Chiba (JP); Yutaka Azuma, Chiba (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/895,314

(22) Filed: Jul. 2, 2001

(65) Prior Publication Data

US 2002/0103276 A1 Aug. 1, 2002

Related U.S. Application Data

(63) Continuation of application No. 09/296,739, filed on Apr. 23, 1999, now Pat. No. 6,284,822.

(30) Foreign Application Priority Data

May 6, 1998 (JP) ............................................. 10-123361

(51) Int. Cl.⁷ ............................. C08K 5/15; C08K 5/34; C08K 5/51

(52) U.S. Cl. ........................ 524/108; 524/101; 524/128; 524/129; 524/153

(58) Field of Search ................................. 524/101, 108, 524/128, 129, 153

(56) References Cited

U.S. PATENT DOCUMENTS 5,736,597 A * 4/1998 Birbaum et al. ............ 524/100

* cited by examiner

Primary Examiner—Kriellion A. Sanders
(74) Attorney, Agent, or Firm—Oblon, Spivak, McClelland, Maier & Neustadt, P.C.

(57) ABSTRACT

Disclosed is a film or sheet of a polypropylene resin composition comprising the following components (A), (B) and (C):

(A) 100 parts by weight of a polypropylene resin,
(B) from 0.001 to 1 part by weight of a phenolic antioxidant such as 1,3,5-tris(4-t-butyl-3-hydroxy-2,6-dimethylbenzyl)isocyanurate or the like, and
(C) from 0.05 to 5 parts by weight of a hindered amine-based light stabilizer.

Provided are filmy or sheet moldings of the polypropylene resin composition which color little even when stored indoors at relatively high temperatures; and also the polypropylene resin composition for the moldings.

11 Claims, No Drawings

POLYPROPYLENE RESIN COMPOSITION, AND FILM AND SHEET USING THE SAME

This application is a continuation of application Ser. No. 09/296,739, filed Apr. 23, 1999, now U.S. Pat. No. 6,284,822.

BACKGROUND OF THE INVENTION

1. Field of the Invention

The present invention relates to a polypropylene resin composition with improved weather resistance, and to moldings of films and sheets comprising the composition. Precisely, it relates to a polypropylene resin composition which colors little (in pale red) even when exposed to relatively high temperatures while stored indoors, and to moldings of films and sheets comprising the composition.

2. Description of the Related Art

Polypropylene resins are known to be degraded by various factors in the environment, such as sunlight, atmospheric temperature, oxygen in air, etc. Various weatherproofing agents are added to polypropylene resins so as to retard the degradation of the resins.

However, even though ordinary weatherproofing agents are added to polypropylene resins, the moldings of films and sheets comprising the resulting resin composition often color in pale red on their surfaces in a few months if they are exposed to relatively high temperatures while they are stored indoors.

The reason for such coloration is not clear. However, it is said that the coloration is not caused by the degradation of the polymer itself but is by the additives which color by themselves, and, in experiences, it is known that the degree of coloration depends on the type of the additives. At present, therefore, phenolic antioxidants which color in a lower degree are being used for polypropylene resins, in place of amine-based antioxidants which color in a higher degree.

However, even polypropylene resin compositions comprising such a phenolic antioxidant are still not on a satisfactory level.

With no effective measures for solving the problem, polypropylene resins have heretofore been used exclusively in the field in which the coloration could be negligible. Recently, however, films of polypropylene resins as degraded with organic peroxides are being put into practical use, and their coloration is now being a serious problem in the art.

Given that situation, the object of the invention is to provide moldings of films and sheets of polypropylene resins which color little even when stored indoors at relatively high temperatures, and to provide a polypropylene resin composition useful as the starting material for the moldings.

SUMMARY OF THE INVENTION

Having studied the problem noted above, we, the present inventors have found that a specific phenolic antioxidant is effective for not only ordinary polypropylene resins but also for polypropylene resins as degraded with organic peroxides and that the phenolic antioxidant is more effective when combined with a specific phosphorus-containing antioxidant. On the basis of these findings, we have completed the present invention. The invention is summarized as follows:

(1) A polypropylene resin composition comprising the following components:

(A) 100 parts by weight of a polypropylene resin, (B) from 0.001 to 1 part by weight of a phenolic antioxidant of a formula (I) or (II):

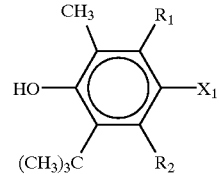

(I)

wherein $R_1$ and $R_2$ each represent a hydrogen atom, an alkyl group having from 1 to 18 carbon atoms, or an alkenyl group having from 3 to 18 carbon atoms; and $X_1$ represents an organic residue,

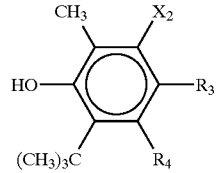

(II)

wherein $R_3$ and $R_4$ each represent a hydrogen atom, an alkyl group having from 1 to 18 carbon atoms, or an alkenyl group having from 3 to 18 carbon atoms; and $X_2$ represents an organic residue, and (C) from 0.05 to 5 parts by weight of a hindered amine-based light stabilizer.

(2) A polypropylene resin composition comprising the following components:

(A) 100 parts by weight of a polypropylene resin, (B) from 0.001 to 1 part by weight of a mixed antioxidant that comprises (B1) a phenolic antioxidant of the following formula (I) or (II) and (B2) a phosphorus-containing antioxidant selected from tris(2,4-di-t-butylphenyl) phosphite, tetrakis(2,4-di-t-butylphenyl)-4,4'-biphenylene diphosphite, and [bis (2,4-di-tert-butyl-5-methylphenoxy)phosphino]biphenyl in a ratio by weight, (B1) to (B2), of from 19:1 to 1:19,

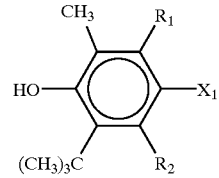

(I)

wherein $R_1$ and $R_2$ each represent a hydrogen atom, an alkyl group having from 1 to 18 carbon atoms, or an alkenyl group having from 3 to 18 carbon atoms; and $X_1$ represents an organic residue,

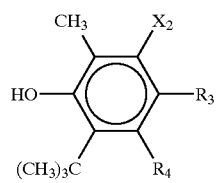

(II)

wherein $R_3$ and $R_4$ each represent a hydrogen atom, an alkyl group having from 1 to 18 carbon atoms, or an alkenyl group having from 3 to 18 carbon atoms; and $X_2$ represents an organic residue, and (C) from 0.05 to 5 parts by weight of a hindered amine-based light stabilizer.

(3) The polypropylene resin composition of (1) or (2), wherein the phenolic antioxidant of formula (II) is 1,3,5-tris(4-t-butyl-3-hydroxy-2,6-dimethylbenzyl) isocyanurate.

(4) The polypropylene resin composition of (1) or (2), wherein the phenolic antioxidant of formula (I) is 3,9-bis[1,1-dimethyl-2-[β-(3-t-butyl-4-hydroxy-5-methylphenyl)propionyloxy]ethyl]-2,4,8,10-tetroxaspiro[5,5]undecane.

(5) A polypropylene resin composition comprising the following components:

(A) 100 parts by weight of a polypropylene resin, (B) from 0.001 to 1 part by weight of bis(ethyl 3,5-di-t-butyl-4-hydroxybenzylphosphonato)calcium, and (C) from 0.05 to 5 parts by weight of a hindered amine-based light stabilizer.

(6) A polypropylene resin composition comprising the following components:

(A) 100 parts by weight of a polypropylene resin, (B) from 0.001 to 1 part by weight of a mixed antioxidant that comprises (B1) bis(ethyl 3,5-di-t-butyl-4-hydroxybenzylphosphonato)calcium and (B2) a phosphorus-containing antioxidant selected from tris(2,4-di-t-butylphenyl) phosphate, tetrakis(2,4-di-t-butylphenyl)-4,4'-biphenylene diphosphite, and [bis(2,4-di-tert-butyl-5-methylphenoxy) phosphino]biphenyl in a ratio by weight, (B1) to (B2), of being of from 19:1 to 1:19, and (C) from 0.05 to 5 parts by weight of a hindered amine-based light stabilizer.

(7) The polypropylene resin composition of any one of (1) to (6), wherein the polypropylene resin satisfies the following requirements:

(i) it has a peak melting temperature (Tm) of 150° C. or above as measured through differential scanning calorimetry (DSC), and (ii) it has a tensile modulus of from 200 to 700 MPa.

(8) The polypropylene resin composition of (7), wherein the polypropylene resin comprises the following components (a) and (b)

(a) from 20 to 100% by weight of a propylene homopolymer and/or a propylene copolymer containing at most 4% by weight of other olefin units, the homopolymer and the copolymer satisfying the following requirements:

(iii) they have a pentad fraction, rrrr/(1-mmmm)×100, as measured through isotopic carbon nuclear magnetic resonance spectrometry ($^{13}$C-NMR) of from 20 to 60%, and (iv) they have a melting enthalpy (ΔH) as measured through differential scanning calorimetry (DSC) of from 10 to 100 J/g, and (b) from 0 to 80% by weight of a propylene copolymer containing from 10 to 80% by weight of non-propylene olefin units.

(9) A film or sheet made by molding the polypropylene resin composition of any one of (1) to (8).

(10) A surface-protective film or sheet as produced by forming an adhesive layer and/or an ink layer on the film or sheet of (9).

DETAILED DESCRIPTION OF THE INVENTION

The invention is described in detail hereinunder.

[1-1] Polypropylene Resin:

The polypropylene resin for use in the invention preferably has a melt flow rate (MFR, as measured at 230° C. and under a load of 2.16 kg according to JIS-K7210) of from 0.1 to 200 g/10 min, more preferably from 5 to 60 g/10 min.

The polypropylene resin includes, for example, propylene homopolymers, propylene-ethylene random or block copolymers, as well as mixtures of those polymers with one or more other random or block copolymers of propylene with α-olefins such as ethylene, butene-1, pentene-1,4-methyl-pentene-1, hexene-1, octene-1, etc.

Also usable herein are resin compositions comprising those polymers and various synthetic rubbers such as ethylene-propylene copolymer rubber, ethylene-propylene-non-conjugated diene copolymer rubber, polybutadiene, polyisoprene, chloropolyethylene, chloropolypropylene, styrene-ethylene-butadiene-styrene block copolymer (SEBS), styrene-butadiene-styrene block copolymer (SBS), etc.

[1-2] Specific Polypropylene Resin:

Specific polypropylene resins to be mentioned below are especially preferred for use in the invention.

Preferably used herein are polypropylene resins having (i) a peak melting temperature (Tm) of 150° C. or above as measured through differential scanning calorimetry (DSC) and (ii) a tensile modulus of from 200 to 700 MPa.

The polypropylene resins of that type are not specifically defined, and may be propylene homopolymers or copolymers of propylene and other olefins, or even their mixtures.

Concretely, employable are (a) propylene homopolymers and/or copolymers containing at most 4% by weight of other olefin units, or as well as compositions comprising the resin component (a) and an additional component (b) of a propylene copolymer that contains from 10 to 80% by weight of non-propylene olefin units.

Especially preferably, however, the polypropylene resin for use in the invention comprises (a) from 20 to 100% by weight of a propylene homopolymer having (iii) a pentad fraction, rrrr/(1-mmmm)×100, as measured through isotopic carbon nuclear magnetic resonance spectrometry ($^{13}$C-NMR) of from 20 to 60%, and (iv) a melting enthalpy (ΔH) as measured through differential scanning calorimetry (DSC) of from 10 to 100 J/g, and/or a propylene copolymer containing at most 4% by weight of other olefin units and having the physical data of (iii) and (iv), and (b) from 0 to 80% by weight of a propylene copolymer containing from 10 to 80% by weight of non-propylene olefin units.

The preferred properties (i) to (iv) of the polypropylene resin for use in the invention are described below.

First, the polypropylene resin preferably has (i) a peak melting temperature (Tm) of 150° C. or above as measured through differential scanning calorimetry (DSC). If Tm of the resin is lower than 150° C., the resin composition could not have good heat resistance. Tm generally falls between 150 and 165° C. Tm is measured with Perkin-Elmer's DSC-7, in terms of the peak melting temperature according to JIS-K7121.

Next, the polypropylene resin preferably has (ii) a tensile modulus of from 200 to 700 MPa, more preferably from 400 to 600 MPa. If the tensile modulus is smaller than 200 MPa, the strength and the stiffness of the resin composition will be poor. If, however, larger than 700 MPa, the flexibility and the low-temperature impact resistance of the resin composition will be poor. The tensile modulus of the resin is measured according to JIS-K7113.

Also preferably, the polypropylene resin has (iii) a pentad fraction, rrrr/(1-mmmm)×100, as measured through isotopic carbon nuclear magnetic resonance spectrometry ($^{13}$C-NMR) of from 20 to 60%. If the pentad fraction is smaller than 20% by weight, the resin composition will have poor heat resistance. If, however, larger than 60% by weight, the flexibility of the resin composition will be poor. For these reasons, the preferred range of the pentad fraction, rrrr/(1-mmmm)×100, falls between 25 and 55%. "rrrr" as referred to herein is meant to indicate the configuration of a polypropylene structure in which 5 side chains of methyl groups are positioned alternately in the opposite directions relative to the main chain of carbon—carbon bonds composed of any continuous 5 propylene units, or its proportion in the propylene polymer; and "mmmm" also referred to herein is meant to indicate the configuration of a polypropylene structure in which 5 side chains of methyl groups are positioned all in the same direction relative to the main chain of carbon—carbon bonds composed of any continuous 5 propylene units, or its proportion in the propylene polymer.

The value rrrr/(1-mmmm)×100 is measured as follows: Using JNM-FX-200 (manufactured by JOEL Ltd.; $^{13}$C-NMR frequency, 50.1 MHz), a polymer sample is subjected to $^{13}$C-NMR, for which the measuring mode is of proton complete decoupling, the pulse width is 6.9 μs (45°), the pulse repeating time is 3 seconds, the number of integrations is 10000, the solvent is 1,2,4-trichlorobenzene/heavy benzene (90/10, % by volume), the sample concentration is 250 mg/2.5 ml of solvent, and the system temperature is 130° C. Based on the difference in the chemical shift owing to the stereospecificity of the methyl groups in the polymer sample, or that is, on the areal intensity ratio of each peak of mmmm to mrrm appearing in the range of from 19.5 to 22.5 ppm, the pentad fraction of the polymer sample is measured, and the value of rrrr/(1-mmmm)×100 is obtained.

mmmm: 21.86 ppm mmmr: 21.62 ppm mmrr: 21.08 ppm mmrm+rrmr: 20.89 ppm rrrr: 20.36 ppm mrrm: 19.97 ppm In addition, it is further preferable that the polypropylene resin for use in the invention has (iv) a melting enthalpy (ΔH) as measured through differential scanning calorimetry (DSC) of from 10 to 100 J/g. If ΔH is larger than 100 J/g, the resin composition will lose flexibility and therefore the object of the invention could not be attained. More preferably, ΔH falls between 20 and 100 J/g. ΔH is measured with Perkin-Elmer's DSC-7 in terms of the total heat energy as absorbed by the polymer being melted, according to JISK-7122. In measuring Tm and ΔH through DSC, the heating and cooling rate is 10° C./min.

It is desirable that the component (a) comprising a propylene homopolymer and/or a propylene copolymer containing at most 4% by weight of other olefin units has a boiling n-heptane-insoluble content of from 40 to 95% by weight. If the boiling n-heptane-insoluble content of the component (a) is larger than 95% by weight, the resin composition will lose flexibility. However, if smaller than 40% by weight, the mechanical strength of the resin composition will poor. In view of the balance of the flexibility and the mechanical strength of the resin composition, the more preferred range of the boiling n-heptane-insoluble content of the component (a) falls between 45 and 90% by weight. The boiling n-heptane-insoluble content of the component (a) is calculated from the extraction residue of the component (a) having been extracted with boiling n-heptane for 6 hours in a Soxhlet's extraction tester.

In the propylene homopolymer and/or copolymer containing at most 4% by weight of other olefin units for the component (a), in general, carbons having side chains of methyl groups are not positioned adjacent to each other in the propylene chain moiety, or that is, there is no inverted carbon-to-carbon bonding therein. In these, the carbons having side chains of methyl groups are alternately positioned in regular order in the propylene chain moiety. In other words, in the polymers of the invention, the propylene units are bonded in a mode of head-tail bonding, and there is substantially neither head—head bonding nor tail—tail bonding.

In the propylene copolymer containing at most 4% by weight of other olefin units of the component (a), the comonomer olefins for the other olefin units include, for example, α-olefins such as ethylene, butene-1, pentene-1,4-methyl-1-pentene, hexene-1, heptene-1, octene-1, nonene-1, decene-1, etc. Of those, preferred is ethylene. One or more of these olefins may be used either singly or as combined. It is necessary that the comonomer olefins are so used that the olefin-derived unit content of the resulting propylene copolymer is at most 4% by weight.

In the propylene copolymer (b) containing from 10 to 80% by weight of non-propylene olefin units, the comonomer olefins for the non-propylene olefin units include, for example, α-olefins such as ethylene, butene-1, pentene-1, 4-methyl-1-pentene, hexene-1, heptene-1, octene-1, nonene-1, decene-1, etc.; dienes such as butadiene, dicyclopentadiene, tricyclopentadiene, etc. One or more of these comonomer olefins may be used either singly or as combined.

Where the polypropylene resin component for use in the invention contains the propylene copolymer of the component (b), the amount of the component (b) that may be in the resin component is at most 80% by weight. The presence of the component (b) in an amount of larger than 80% by weight is unfavorable in view of the strength, the elasticity and the heat resistance of the resin composition. Preferably, the amount of the component (b) that may be in the resin component is not larger than 70% by weight, more preferably not larger than 60% by weight.

In the polypropylene resin for use in the invention, it is desirable that the polypropylene resin of the component (a) has a melt flow rate (MFR) falling between 0.5 and 200 g/10 min. If MFR of the component (a) is smaller than 0.5 g/10 min, the resin composition will be difficult to mold; but if larger than 200 g/10 min, the mechanical properties of the moldings of the composition will be poor. In view of the balance between the moldability and the mechanical properties of the moldings, the more preferred range of MFR falls between 2 and 100 g/10 min. MFR is measured under a load of 2.16 kg and at a temperature of 230° C.

The polypropylene resin comprising the component (a) or the components (a) and (b) for use in the invention may be prepared, for example, through single-stage vapor-phase polymerization, single-stage slurry polymerization, multi-stage vapor-phase polymerization, multi-stage slurry polymerization, blending or the like. For example, where the resin is prepared through polymerization, propylene may be homopolymerized or copolymerized with any other olefins in the presence of a catalyst system comprising (W) a solid component that comprises (i) a solid catalyst component composed of magnesium, titanium, a halogen atom and an electron donor, optionally combined with (ii) a crystalline polyolefin, (X) an organic aluminium compound, (Y) an alkoxy group-having aromatic compound, and optionally (Z) an electron-donating compound.

The solid component (W) comprises (i) a solid catalyst component composed of magnesium, titanium, a halogen atom and an electron donor, optionally combinedwith (ii) a crystalline polyolefin. The solid catalyst component (i) comprises, as the indispensable ingredients, magnesium, titanium, a halogen atom and an electron donor. This may be prepared by contacting a magnesium compound and a titanium compound with an electron donor. In this case, the halogen atom may be in the magnesium compound and/or the titanium compound in the form of a halide.

The magnesium compound includes, for example, magnesium dihalides such as magnesium chloride, etc.; magnesium oxide, magnesium hydroxide, hydrotalcite, magnesium carboxylates; alkoxymagnesiums such as diethoxymagnesium, etc.; aryloxymagnesiums, alkoxymagnesium halides, aryloxymagnesium halides; alkylmagnesiums such as ethylbutylmagnesium, etc.; alkylmagnesium halides; as well as reaction products of organic magnesium compounds with electron donors, halosilanes, alkoxysilanes, silanols, aluminium compounds, etc. Of those, preferred are magnesium halides, alkoxymagnesiums, alkylmagnesiums, alkylmagnesium halides. One or more of these magnesium compounds maybe used either singly or as combined.

As the magnesium compound, also usable are reaction products of metal magnesium, halogens and alcohols. The metal magnesium is not specifically defined, and may have any grain size. For example, employable is any of granular, ribbon-like or powdery metal magnesium. The surface condition of the metal magnesium is not also specifically defined. Preferably, however, the metal magnesium does not have a film of magnesium oxide or the like on its surface.

The alcohol is not also specifically defined, but preferably used is a lower alcohol having from 1 to 6 carbon atoms. Especially preferred is ethanol, as producing a solid catalyst component capable of greatly improving the expression of the catalyst capabilities. The purity and the water content of the alcohol are not also specifically defined. However, if an alcohol having a large water content is used, magnesium hydroxide may be formed on the surface of the metal magnesium. Therefore, preferred is an alcohol having a water content of not larger than 1% by weight, especially not larger than 2000 ppm. Alcohols having a smaller water content are better.

The halogens and/or the halogen-containing compounds for use in the invention are not specifically defined. Any and every compound containing a halogen atom in the molecule can be used herein. In the halogen-containing compounds, the type of the halogen atom is not specifically defined. Preferred is chlorine, bromine or iodine; and especially preferred is iodine. Of the halogen-containing compounds, especially preferred are halogen-containing metal compounds. Their condition, shape and grain size are not specifically defined and may be any desired ones. For example, the compounds maybe used in the form of a solution in an alcoholic solvent (e.g., ethanol).

The amount of the alcohol to be used may fall between 2 and 100 mols, preferably between 5 and 50 mols, relative to one mol of the metal magnesium. If the alcohol is too much, magnesium compounds with good morphology are difficult to obtain. If too small, on the other hand, the reaction between the alcohol and the metal magnesium could not be effected smoothly.

The halogen and/or the halogen-containing compound may be used generally in an amount of not smaller than 0.0001 gram atoms, but preferably not smaller than 0.0005 gram atoms, more preferably not smaller than 0.001 gram atoms, in terms of the halogen atom relative to one gram atom of the metal magnesium. If it is smaller than 0.0001 gram atoms, and if the resulting magnesium compounds are directly used without being ground, the amount of the compound to be carried on the catalyst will be low and, in addition, the activity of the catalyst and even the stereospecificity and the morphology of the polymer formed will be poor. For these reasons, unfavorably, the magnesium compounds formed indispensably require grinding. By suitably varying the amount of the halogen and/or the halogen-containing compound to be used, the grain size of the magnesium compound to be formed can be controlled in any desired manner.

The reaction of the metal magnesium, the alcohol and the halogen and/or the halogen-containing compound may be effected in any per-se known manner. For example, a metal magnesium, an alcohol and a halogen and/or halogen-containing compound may be reacted under reflux until no hydrogen gas is formed, generally for about 20 to 30 hours to obtain the intended magnesium compound. Concretely, where iodine is used as the halogen, a metal magnesium and a solid iodine are put into an alcohol, and then heated under reflux; or an alcoholic solution of a metal magnesium and iodine is dropwise added to an alcohol, and then heated under reflux; or an alcoholic solution of a metal magnesium is heated, to which is dropwise added an alcoholic solution of iodine. In any of these methods, it is desirable that the reaction is effected in an inert gas atmosphere of nitrogen gas, argon gas or the like, optionally in an inert organic solvent (e.g., saturated hydrocarbons such as n-hexane, etc.). Regarding the mode of putting the metal magnesium, the alcohol and the halogen and/or halogen-containing compound into a reactor, it is not always necessary that they are entirely put in the reactor prior to the start of the reaction, but they may be divided into plural portions and maybe separately put into the reactor. In one preferred embodiment, the entire amount of an alcohol is first put into a reactor, and thereafter a metal magnesium having been divided into plural portions is added thereto intermittently.

In that embodiment, formation of a large amount of hydrogen gas at a time may be prevented. Therefore, the embodiment is especially preferred. In addition, the size of the reactor for the embodiment may be small. Moreover, in the embodiment, the alcohol and the halogen and/or halogen-containing compound may be prevented from being bubbled due to the large amount of hydrogen gas formed at a time. The number of the plural portions of the metal magnesium to be separately added to the reactor may be determined, depending on the scale of the reactor used. In view of the easiness in handling the reaction system, in general, the number may be preferably from 5 to 10. Needless-to-say, the reaction may be effected either batchwise or continuously. In another modification, the entire amount of an alcohol is first put into a reactor, and a metal magnesium is added thereto little by little. Then, the product formed through the reaction is separated into a different tank, and thereafter the remaining metal magnesium is again added to the reactor also little by little. The removal of the product and the addition of the metal magnesium may be repeated.

The magnesium compound thus prepared is used in preparing the solid catalyst component. For this, the magnesium compound may be dried, or, after having been taken out through filtration, it may be washed with an inert solvent such as heptane or the like. In any case, the magnesium compound does not require grinding or classification for dressing, and may be used directly in the next step.

The titanium compound for use in the invention includes, for example, tetraalkoxytitaniums such as tetramethoxytitanium, tetraethoxytitanium, tetra-n-propoxytitanium, tetraisopropoxytitanium, tetra-n-butoxytitanium, tetraisobutoxytitanium, tetracyclohexyloxytitanium, tetraphenoxytitanium, etc.; titanium tetrahalides such as titanium tetrachloride, titanium tetrabromide, titanium tetraiodide, etc.; alkoxytitanium halides such as methoxytitanium trichloride, ethoxytitanium trichloride, propoxytitanium trichloride, n-butoxytitanium trichloride, ethoxytitanium tribromide, etc.; dialkoxytitanium dihalides such as dimethoxytitanium dichloride, diethoxytitanium dichloride, dipropoxytitanium dichloride, di-n-butoxytitanium dichloride, diethoxytitanium dibromide, etc.; trialkoxytitanium monohalides such as trimethoxytitanium chloride, triethoxytitanium chloride, tripropoxytitanium chloride, tri-n-butoxytitanium chloride, etc. Of those, preferred are high-halogen titanium compounds, and especially preferred is titanium tetrachloride. One or more of these titanium compounds may be used either singly or as combined.

The electron donor may be the same as the electron-donating compound for the component (Z), of which the examples will be mentioned hereinunder.

To prepare the solid catalyst component (i), employable are any known methods (JP-A 53-43094, 55-135102, 55-135103, 56-18606, 56-166205, 57-63309, 57-190004, 57-300407, 58-47003).

The composition of the solid catalyst component (i) thus prepared is generally such that the atomic ratio of magnesium/titanium therein falls between 2 and 100, the atomic ratio of halogen/titanium falls between 5 and 100 and the molar ratio of electron donor/titanium falls between 0.1 and 10.

The crystalline polyolefin (ii) that is optionally used in preparing the solid component (W) may be obtained from α-olefins having from 2 to 10 carbon atoms, including, for example, polyethylene, polypropylene, polybutene, poly-4-methyl-1-pentene, etc. The crystalline polyolefin may be prepared in any of (1) a method of prepolymerizing an olefin in the presence of a combination of the solid catalyst component (i) noted above, an aluminium compound and optionally an electron-donating compound (prepolymerization method); (2) a method of dispersing the solid catalyst component (i) noted above and optionally an organic aluminium compound and an electron-donating compound (having a melting point of not lower than 100° C.) into a powdery, crystalline polyethylene or polypropylene or the like having a uniform grain size (dispersion method); or (3) a combination of the methods (1) and (2).

In the prepolymerization method (1), the atomic ratio of aluminium/titanium generally falls between 0.1 and 100, preferably between 0.5 and 5, and the molar ratio of electron-donating compound/titanium falls between 0 and 50, preferably between 0.1 and 2.

In the solid component (W), the amounts of the solid catalyst component (i) and the crystalline polyolefin (ii) are so controlled that the ratio by weight of (ii) to (i) generally falls between 0.33 and 200, preferably between 1 and 50.

As the organic aluminium compound for the component (X), for example, preferably employed is any of trialkylaluminiums such as trimethylaluminium, triethylaluminium, triisopropylaluminium, triisobutylaluminium, trioctylaluminium, etc.; dialkylaluminium monohalides such as diethylaluminium monochloride, diisopropylaluminium monochloride, diisobutylaluminium monochloride, dioctylaluminium monochloride, etc.; alkylaluminium sesquihalides such as ethylaluminium sesquichloride, etc. One or more of these aluminium compounds may be used herein either singly or as combined.

The catalyst system to be used for producing the polypropylene resin for use in the invention comprises an alkoxy group-having aromatic compound as the component (Y) As specific examples of the alkoxy group-having aromatic compound, mentioned are monoalkoxy compounds such as m-methoxytoluene, o-methoxyphenol, m-methoxyphenol, 2-methoxy-4-methylphenol, vinylanisole, p-(1-propenyl) anisole, p-allylanisole, 1,3-bis(p-methoxyphenyl)-1-pentene, 5-allyl-2-methoxyphenol, 4-hydroxy-3-methoxybenzyl alcohol, methoxybenzyl alcohol, nitroanisole, nitrophenetole, etc.; dialkoxy compounds such as o-dimethoxybenzene, m-dimethoxybenzene, p-dimethoxybenzene, 3,4-dimethoxytoluene, 2,6-dimethoxyphenol, 1-allyl-3,4-dimethoxybenzene, etc.; trialkoxy compounds such as 1,3,5-trimethoxybenzene, 5-allyl-1,2,3-trimethoxybenzene, 5-allyl-1,2,4-trimethoxybenzene, 1,2,3-trimethoxy-5-(1-propenyl) benzene, 1,2,4-trimethoxy-5-(1-propenyl)benzene, 1,2,3-trimethoxybenzene, 1,2,4-trimethoxybenzene, etc. Of those, preferred are dialkoxy compounds and trialkoxy compounds. One or more of these alkoxy group-having aromatic compounds may be used either singly or as combined.

The catalyst optionally contains an electron-donating compound as the component (Z). The electron-donating compound has any of oxygen, nitrogen, phosphorus, sulfur, silicon, etc. Basically, any one capable of improving the specificity of the catalyst in polymerization of propylene may be used as the electron-donating compound for the component (Z).

The electron-donating compound of that type includes, for example, organic silicon compounds, esters, thioesters, amines, ketones, nitriles, phosphines, ethers, thioethers, acid anhydrides, acid halides, acid amides, aldehydes, organic acids, azo compounds, etc.

For example, employable are organic silicon compounds such as diphenyldimethoxysilane, diphenyldiethoxysilane, dibenzyldimethoxysilane, tetramethoxysilane, tetraethoxysilane, tetraphenoxysilane, methyltrimethoxysilane, methyltriethoxysilane, methyltriphenoxysilane, phenyltrimethoxysilane, phenyltriethoxysilane, benzyltrimethoxysilane, cyclohexylmethyldimethoxysilane, etc.; monomethyl phthalate, monoethyl phthalate, monopropyl phthalate, monobutyl phthalate, monoisobutyl phthalate, monoamyl phthalate, monoisoamyl phthalate, monomethyl terephthalate, monoethyl terephthalate, monopropyl terephthalate, monobutyl terephthalate, monoisobutyl terephthalate; aromatic dicarboxylates such as dimethyl phthalate, diethyl phthalate, dipropyl phthalate, dibutyl phthalate, diisobutyl phthalate, diamyl phthalate, diisoamyl phthalate, methylethyl phthalate, methylisobutyl phthalate, methylpropyl phthalate, ethylbutyl phthalate, ethylisobutyl phthalate, ethylpropyl phthalate, propylisobutyl phthalate, dimethyl terephthalate, diethyl terephthalate, dipropyl terephthalate, diisobutyl terephthalate, methylethyl terephthalate, methylisobutyl terephthalate, methylpropyl terephthalate, ethylbutyl terephthalate, ethylisobutyl terephthalate, ethylpropyl terephthalate, propylisobutyl terephthalate, dimethyl isophthalate, diethyl isophthalate, dipropyl isophthalate, diisobutyl isophthalate, methylethyl isophthalate, methylisobutyl isophthalate, methylpropyl isophthalate, ethylbutyl isophthalate, ethylisobutyl isophthalate, ethylpropyl isophthalate, propylisobutyl isophthalate, etc.; monoesters such as methyl formate, ethyl formate, methyl acetate, ethyl acetate, vinyl acetate, propyl acetate, octyl acetate, cyclohexyl acetate, ethyl propionate, methyl butyrate, ethyl butyrate, ethyl valerate, methyl chloroacetate, ethyl dichloroacetate, methyl methacrylate, ethyl crotonate, ethyl pivalate, dimethyl maleate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, ethyl p-butoxybenzoate, ethyl o-chlorobenzoate, ethyl naphthoate, etc.; esters such as γ-butyrolactone, δ-valerolactone, coumarin, phthalide, ethylene carbonate, etc.; organic acids such as benzoic acid, p-hydroxybenzoic acid, etc.; acid anhydrides such as succinic anhydride, benzoic anhydride, p-toluic anhydride, etc.; ketones such as acetone, methyl ethyl ketone, methyl isobutyl ketone, acetophenone, benzophenone, benzoquinone, etc.; aldehydes such as acetaldehyde, propionaldehyde, octylaldehyde, tolualdehyde, benzaldehyde, naphthylaldehyde, etc.; acid halides such as acetyl chloride, acetyl bromide, propionyl chloride, butyryl chloride, isobutyryl chloride, 2-methylpropionyl chloride, valeryl chloride, isovaleryl chloride, hexanoyl chloride, methylhexanoyl chloride, 2-ethylhexanoyl chloride, octanoyl chloride, decanoyl chloride, undecanoyl chloride, hexadecanoyl chloride, octadecanoyl chloride, benzylcarbonyl chloride, dicyclohexanecarbonyl chloride, malonyl dichloride, succinyl dichloride, pentanedioleyl dichloride, hexanedioleyl dichloride, cyclohexanedicarbonyl dichloride, benzoyl chloride, benzoyl bromide, methylbenzoyl chloride, phthaloyl chloride, isophthaloyl chloride, terephthaloyl chloride, benzene-1,2,4-tricarbonyl trichloride, etc.; ethers such as methyl ether, ethyl ether, isopropyl ether, n-butyl ether, isopropyl methyl ether, isopropyl ethyl ether, t-butyl ethyl ether, t-butyl n-propyl ether, t-butyl n-butyl ether, t-amyl methyl ether, t-amyl ethyl ether, amyl ether, tetrahydrofuran, anisole, diphenyl ether, ethylene glycol butyl ether, etc.; acid amides such as acetic acid amide, benzoic acid amide, toluic acid amide, etc.; amines such as tributylamine, N,N'-dimethylpiperazine, tribenzylamine, aniline, pyridine, pyrroline, tetramethylethylenediamine, etc.; nitriles such as acetonitrile, benzonitrile, tolunitrile, etc.; azo compounds having a steric hindrance substituent as bonded to the azo bond, such as 2,2'-azobis(2-methylpropane), 2,2'-azobis (2-ethylpropane), 2,2'-azobis (2-methylpentane), etc.

Of those, preferred are organic silicon compounds, esters, ketones, ethers, thioethers, acid anhydrides, and acid halides. Especially preferred are organic silicon compounds such as diphenyldimethoxysilane, phenyltriethoxysilane, cyclohexylmethyldimethoxysilane, etc.; aromatic dicarboxylic acid diesters such as di-n-butyl phthalate, diisobutyl phthalate, etc.; alkyl esters of aromatic monocarboxylic acids such as benzoic acid, p-methoxybenzoic acid, p-ethoxybenzoic acid, toluic acid, etc. One or more of these electron-donating compounds may be used either singly or as combined.

Regarding the amounts of the components for the catalyst system, the solid component (W) may be used in an amount of generally from 0.0005 to 1 mol, in terms of the titanium atom, relative to one liter of the reaction volume. The organic aluminium compound (X) may be in an amount of generally from 1 to 3000, but preferably from 40 to 800, in terms of the ratio of aluminium/titanium. If the amounts overstep the defined ranges, the catalytic activity of the catalyst will be low. The alkoxy group-having aromatic compound (Y) may be in an amount of generally from 0.01 to 500, but preferably from 1 to 300, in terms of the molar ratio relative to the titanium atom in the solid component (W). If the amount is smaller than 0.01, the physical properties of the polymer to be produced will be bad. If, however, larger than 500, the catalytic activity of the catalyst will be poor.

To prepare the component (a) for the polypropylene resin that comprises a propylene homopolymer and/or a propylene copolymer containing at most 4% by weight of other olefin units, for example, propylene may be homopolymerized or copolymerized with a small amount of other olefins in one-stage polymerization using the catalyst system noted above. To prepare a mixture of the component (a) and the component (b) of a propylene copolymer, for the polypropylene resin, for example, a resin of the component (a) is first produced in the first polymerization step (first stage polymerization) in the same manner as previously, and thereafter propylene is copolymerized with other olefins in the next polymerization step to form the propylene copolymer for the component (b).

The polymerization mode for preparing the mixture comprising the components (a) and (b) is not specifically defined, including, for example, slurry polymerization, vapor-phase polymerization, bulk polymerization, solution, polymerization, suspension polymerization, etc.

Where a resin of the component (a) is prepared in vapor-phase polymerization, for example, the polymerization pressure generally falls between 10 and 45 kg/cm$^2$, preferably between 20 and 30 kg/cm$^2$, and the polymerization temperature generally falls between 40 and 90° C., preferably between 60 and 75° C. Where a propylene copolymer of the component (b) is prepared also in vapor-phase polymerization, for example, the polymerization pressure generally falls between 5 and 30 kg/cm$^2$, preferably between 10 and 20 kg/cm$^2$, and the polymerization temperature generally falls between 20 and 90° C., preferably between 40 and 60° C. In any stage of polymerization, the molecular weight of the polymer to be formed may be controlled by any ordinary means, for example, by controlling the hydrogen concentration in the polymerization reactor. If desired, (co)polymers having a relatively high molecular weight may be formed in the polymerization step, and the resulting (co)polymers may be mixed in melt with an organic peroxide so as to control their molecular weight to fall within a desired range. The polymerization time may fall between 5 minutes and 10 hours or so.

In producing polymers in the presence of the catalyst system, the components (W) to (Z) to constitute the catalyst system are mixed in a predetermined ratio and contacted with each other, and thereafter the starting monomers may be immediately introduced into the catalyst system. Alternatively, after the thus-prepared catalyst system is ripened for 0.2 to 3 hours, the starting monomers may be introduced thereinto. If desired, the catalyst components maybe applied to the polymerization system, after having been suspended in the inert solvent to be used or in the starting monomers of olefins to be polymerized.

After the polymerization, the polymers produced may be post-treated in any ordinary manner. For example, in vapor-phase polymerization, the powdery polymer produced is taken out of the polymerization reactor, into which nitrogen or the like may be introduced in streams so as to remove the non-reacted monomers and others from the polymer. If desired, the powdery polymer may be pelletized through an extruder. In this case, a small amount of water, an alcohol or the like may be added to the polymer so as to completely inactivate the remaining catalyst. In bulk polymerization, the polymer produced is taken out of the polymerization reactor, then the non-reacted monomers are removed from the polymer, and thereafter the polymer may be pelletized.

Where a polypropylene resin comprising the components (a) and (b) is used in the invention, a resin for the component (a) and that for the component (b) maybe separately prepared, and these may be mixed in a predetermined ratio in any known manner (for example, through dry blending, solution blending, or kneading) to prepare a mixture of the components (a) and (b).

When prepared in the form of a powdery polymer through polymerization, the polypropylene resin for use in the invention may be degraded with a peroxide in an extruder, thereby having a lower molecular weight. The resin composition containing the thus-degraded resin is easy to handle while it is molded. The degraded resin may have an increased degree of fluidity, but its pentad fraction, peak melting temperature and melting enthalpy change little. The peroxide to be used for that purpose includes, for example, 2,5-dimethyl-2,5-di-(t-butylperoxy)-hexane, 1,3-bis(t-butylperoxyisopropyl)benzene, 2,5-dimethyl-2,5-di-(t-butylperoxy)hexyne-3, etc. When the resin is mixed with the peroxide, a specific antioxidant to be mentioned hereinunder and a chlorine-trapping agent are added thereto.

[2-1] Use of Specific Phenolic Antioxidant Only:
Phenolic Antioxidant for Component (B):

In the invention, at least one specific phenolic antioxidant is added to the polypropylene resin in the presence of a hindered amine-based light stabilizer so as to prevent time-dependent coloration of filmy or sheet moldings of the resin composition without interfering with the intrinsic thermal stability of the moldings.

The specific phenolic antioxidants for use in the invention are compounds of formula (I) or (II). For their structure, the compounds are characterized in that they have a phenolic substituent in which the hydroxyl group is sandwiched between the neighboring methyl group and t-butyl group. Specifically, the structure of the compounds of formula (I) is characterized in that the phenolic substituent has an organic residue as bonded to the para-position relative to the hydroxyl group; and the structure of the compounds of formula (II) is characterized in that the phenolic substituent has an organic residue as bonded to the meta-position relative to the hydroxyl group. The compounds having the specific structure are selected from known phenolic antioxidants and used in the invention.

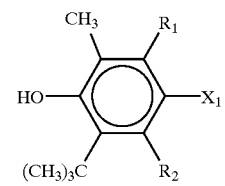

(I)

wherein $R_1$ and $R_2$ each represent a hydrogen atom, an alkyl group having from 1 to 18 carbon atoms, or an alkenyl group having from 3 to 18 carbon atoms; and $X_1$ represents an organic residue.

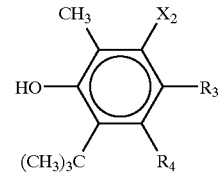

(II)

wherein $R_3$ $R_4$ each represent a hydrogen atom, an alkyl group having from 1 to 18 carbon atoms, or an alkenyl group having from 3 to 18 carbon atoms; and $X_2$ represents an organic residue.

Specific examples of the compounds of formula (I) include 3,9-bis[1,1-dimethyl-2-[β-(3-t-butyl-4-hyroxy-5-methylphenyl) propionyloxy]ethyl]-2,4,8,10-tetroxaspiro[5,5]undecane of formula (I-1)

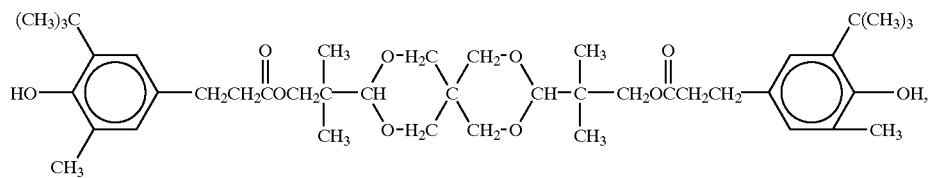

(I-1)

triethylene glycol-bis[3-(3-t-butyl-5-methyl-4-hydroxyphenyl) propiona te] of formula (I-2):

(I-2)

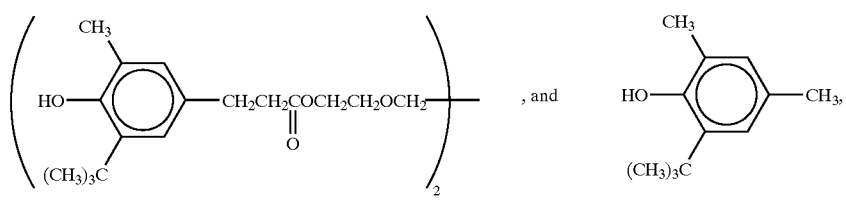, and 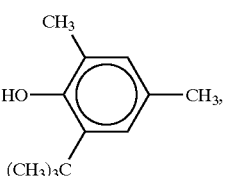

(I-3)

2-t-butyl-4, 6-dimethylphenol of formula (I-3):

Of those, preferred is 3,9-bis[1,1-dimethyl-2-[β-(3-t-butyl-4-hydroxy-5-methylphenyl)propionyloxy]ethyl]-2,4,8,10-tetroxaspiro[5,5]undecane of formula (I-1).

One example of the compounds of formula (II) is 1,3,5-tris(4-t-butyl-3-hydroxy-2,6-dimethylbenzyl)isocyanurate of formula (II-1):

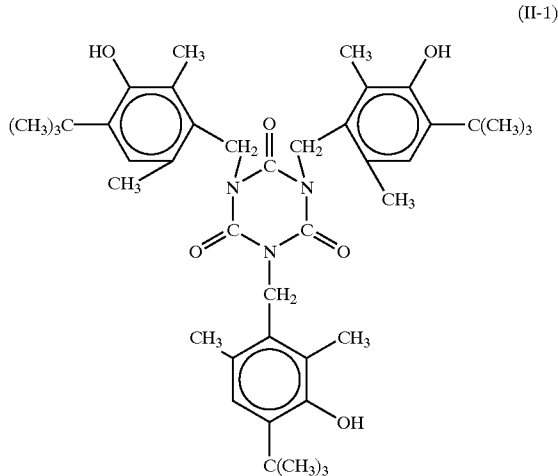

(II-1)

Though not falling within the scope of the compounds of formulae (I) and (II), another phenolic antioxidant, bis(ethyl 3,5-di-t-butyl-4-hydroxybenzylphosphonato)calcium of the following formula (III) is also effective like the compounds of formulae (I) and (II), and can also be used in the invention.

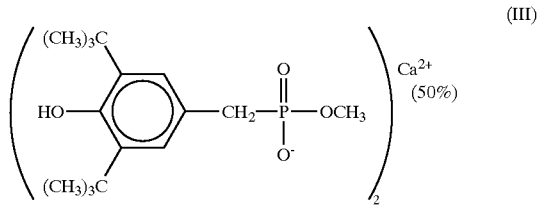

(III)

The polypropylene resin composition of the invention may be prepared by adding from 0.001 to 1 part by weight, more preferably from 0.01 to 0.2 parts by weight of the specific phenolic antioxidant noted above to 100 parts by weight of the polypropylene resin also noted above, in the presence of a hindered amine-based light stabilizer which will be mentioned hereinunder. If the amount of the phenolic antioxidant in the resin composition is smaller than 0.001 parts by weight, the polypropylene resin in the composition will be thermally degraded to have a lowered molecular weight. If, however, the amount is larger than 1 part by weight, the time-dependent coloration of the resin composition will be inevitable.

[2-2] Use of Specific Phenolic Antioxidant in Combination with Specific Phosphorus-Containing Antioxidant:

In the invention, the resin composition may contain a specific phenolic antioxidant such as that mentioned above along with a specific phosphorus-containing antioxidant. The combined use of the two produces a synergistic effect over the use of one only, and is especially effective for polypropylene resins as degraded with organic peroxides such as those noted above. This is because polymers as degraded with organic peroxides require stronger deterioration inhibitors.

In the invention, the time at which the antioxidant is added to the polymer is not specifically defined, but, in general, the antioxidant must be added thereto prior to thermal load to be applied to the polymer being granulated or molded. Where organic peroxides are used in producing polypropylene resins, they generally induce degradation of the resins while the resins are molten and kneaded to be granulated. In that case, therefore, it is suitable that the antioxidant is added to the polymer just before the granulation step.

The resin composition of the invention is prepared by adding from 0.01 to 1 part by weight, more preferably from 0.02 to 0.3 parts by weight of a combination of the specific phenolic antioxidant and the specific phosphorus-containing antioxidant in a ratio by weight of from 19:1 to 1:19, to 100 parts by weight of the polypropylene resin in the presence of a hindered amine-based light stabilizer. The hindered amine-based light stabilizer will be described hereinunder. If the total amount of the two antioxidants added is smaller than 0.01 parts by weight, the polypropylene resin will be thermally degraded to have a lowered molecular weight. If, however, the total amount is larger than 1 part by weight, the time-dependent coloration of the resin composition will be inevitable.

If the ratio of the specific phenolic antioxidant to the specific phosphorus-containing antioxidant is smaller than 1:19, the polypropylene resin will be thermally degraded to have a lowered molecular weight. If, however, the ratio is larger than 19:1, the time-dependent coloration of the resin composition will be inevitable.

Phenolic Antioxidant for Component (B-1):

The phenolic antioxidants for the component (B-1) are the same as those for the component (B) noted above, and their description is omitted.

Phosphorus-Containing Antioxidants for Component (B-2):

The specific phosphorus-containing antioxidants for use in the invention are one or more compounds selected from tris (2,4-di-t-butylphenyl) phosphite, tetrakis (2,4-di-t-butylphenyl)-4,4'-biphenylene diphosphite, and [bis(2,4-di-tert-butyl-5-methylphenoxy)phosphino]biphenyl. Of those, preferred is tris(2,4-di-t-butylphenyl) phosphite.

[3] Hindered Amine-Based Light Stabilizer:

The invention is to prevent time-dependent coloration of filmy or sheet moldings often seen while the moldings are stored indoors, for which the antioxidants mentioned above are effective. However, in the invention, the presence of a light stabilizer in the resin composition is indispensable for ensuring light fastness of the moldings of the composition. In particular, the presence of a hindered amine-based light stabilizer in filmy or sheet moldings of the composition is indispensable.

As the hindered amine-based light stabilizer for use in the invention, mentioned are low-molecular-weight compounds having a molecular weight of smaller than 1000. The compounds include, for example, bis(2,2,6,6-tetramethyl-4-piperidyl) sebacate, tetrakis(2,2,6,6-tetramethyl-4-piperidyl) 1,2,3,4-butane-tetracarboxylate, 2,2,6,6-tetramethyl-4-piperidyl benzoate, bis-(1,2,2,6,6-pentamethyl-4-piperidyl) 2-(3,5-di-t-butyl-4-hydroxybenzyl)-2-n-butylmalonate, bis-(N-methyl-2,2,6,6-tetramethyl-4-piperidyl) sebacate, 1,1'-(1,2-ethanediyl)-bis(3,3,5,5-tetramethylpiperadinone), (mixed 2,2,6,6-tetramethyl-4-piperidyl/tridecyl) 1,2,3,4-butane-tetracarboxylate, (mixed 1,2,2,6,6-pentamethyl-4-piperidyl/tridecyl) 1,2,3,4-butane-tetracarboxylate, tetrakis (1,2,2,6,6-pentamethyl-4-piperidyl) 1,2,3,4-butane-tetracarboxylate, 1-[2-[3-(3,5-di-t-butyl-4-hydroxyphenyl) propionyloxy]ethyl]-4-[3-(3,5-di-t-butyl-4-hydroxyphenyl)

propionyloxy]-2,2,6,6-tetramethylpiperidine, 8-benzyl-7,7,9,9-tetramethyl-3-octyl-1,3,8-triazaspiro[4,5]undecane-2,4-dione, 8-acetyl-3-dodecyl-7,7,9,9-tetramethyl-1,3,8-triazaspiro[4,5]decane-2,4-dione, bis(1-octyloxy-2,2,6,6-tetramethyl-4-piperidyl) sebacate, etc.

Also mentioned are high-molecular-weight compounds having a molecular weight of 1000 or more, which include, for example, dimethyl succinate/1-(2-hydroxyethyl)-4-hydroxy-2,2,6,6-tetramethylpiperidine polycondensates, poly[{6-(1,1,3,3-tetramethylbutyl)amino-1,3,5-triazine-2,4-diyl} {(2,2,6,6-tetramethyl-4-piperidyl)imino}hexamethylene{(2,2,6,6-tetramethyl-4-piperidyl)imine}], N,N'-bis(3-aminopropyl)ethylenediamine/2,4-bis[N-butyl-N-(1,2,2,6,6-pentamethyl-4-piperidyl)amino]-6-chloro-1,3,5-triazine condensates, mixed {1,2,2,6,6-pentamethyl-4-piperidyl/β,β,β',β'-tetramethyl-3,9-[2,4,8,10-tetroxaspiro(5,5)undecane]diethyl} 1,2,3,4-butane-tetracarboxylate, mixed {2,2,6,6-tetramethyl-4-piperidyl/β,β,β',β'-tetramethyl-3,9-[2,4,8,10-tetroxaspiro(5,5)undecane]diethyl} 1,2,3,4-butane-tetracarboxylate, poly[{6-morpholino-1,3,5-triazine-2,4-diyl} {(2,2,6,6-tetramethyl-4-piperidyl)imino}hexamethylene{(2,2,6,6-tetramethyl-4-piperidyl)imine}], etc.

Of those, preferred are bis-(1,2,2,6,6-pentamethyl-4-piperidyl) 2-(3,5-di-t-butyl-4-hydroxybenzyl)-2-n-butyl malonate, N,N'-bis(3-aminopropyl)ethylenediamine/2,4-bis[N-butyl-N-(1,2,2,6,6-pentamethyl-4-piperidyl)amino]-6-chloro-1,3,5-triazine condensates, poly[{6-(1,1,3,3-tetramethylbutyl)amino-1,3,5-triazine-2,4-diyl} {(2,2,6,6-tetramethyl-4-piperidyl)imino}hexamethylene{(2,2,6,6-tetramethyl-4-piperidyl)imine}], bis(1-octyloxy-2,2,6,6-tetramethyl-4-piperidyl) sebacate, tetrakis (1,2,2,6,6-pentamethyl-4-piperidyl) 1,2,3,4-butane-tetracarboxylate, etc.

One or more of these hindered amine-based light stabilizers may be used either singly or as combined. Preferred is a combination of a low-molecular-weight compound and a high-molecular-weight compound.

[4] Formulation, Molding:

To prepare the polypropylene resin composition of the invention, a master batch of the hindered amine-based light stabilizer is added to the polypropylene resin, to which is previously added the antioxidant in the granulation step, optionally along with any other additives of UV absorbent, antistatic agent, chlorine-trapping agent, antiblocking agent, as well as inorganic or organic filler, organic flame retardant, flame retardation promoter, dye, pigment, natural oil, synthetic oil, wax, etc. For mixing them, any known methods are employable. For example, they may be mixed in a tumbler blender, a Henschel mixer or the like, or, after having been mixed, the resulting mixture may be melt-kneaded and granulated through a single-screw or double-screw extruder, or through a kneader, a Banbury mixer or the like to obtain the intended polypropylene resin composition.

Films or sheets of the composition of the invention can be produced in any known molding methods of, for example, inflation molding, cast molding, calender molding or the like.

The films or sheets may be subjected to secondary working of, for example, lamination with a printed substrate, vacuum molding or the like into various final products of decorative laminated films, protective laminated films, etc. The printed ink layer and the adhesive layer to be used for producing the laminated films may be prepared in any known methods. For example, a pattern is printed on a substrate film having been previously subjected to surface treatment, through gravure printing, and the pattern-printed substrate is then coated with an urethane adhesive, and thereafter laminated with a transparent protective film. While being produced or after having been finished, the films and sheets of the invention are effectively prevented from coloring with the lapse of time even though they are stored for a long period of time at high temperatures.

The invention is described in more detail hereinunder with reference to the following Examples, which, however, are not intended to restrict the scope of the invention.

EXAMPLE 1

Production of Polypropylene Resin:

(1) Preparation of Magnesium Compound:

A glass reactor having a volume of about 6 liters and equipped with a stirrer was fully purged with nitrogen gas, into which were put about 2,430 g of ethanol, 16 g of iodine and 160 g of metal magnesium. These were heated and reacted with stirring under reflux, until hydrogen gas was no more formed in the reaction system, to produce a solid reaction product. The reaction mixture containing the solid product thus produced therein was dried under reduced pressure to obtain a magnesium compound.

(2) Preparation of Solid Catalyst Component (W):

Into a 5-liter glass reactor having been fully purged with nitrogen gas, put were 160 g of the magnesium compound (not ground) obtained in (1), 800 ml of pure heptane, 24 ml of silicon tetrachloride, and 23 ml of diethyl phthalate. Then, the reaction system was kept at 80° C., and 770 ml of titanium tetrachloride was added thereto with stirring, and reacted at 110° C. for 2 hours. The resulting solid component was taken out, and washed with pure heptane at 90° C. To this was added 1,220 ml of titanium tetrachloride, and reacted at 110° C. for 2 hours. Then, this was fully washed with pure heptane to obtain a solid catalyst component (W).

(3) Vapor-Phase Polymerization:

Into a 200-liter polymerization reactor, fed were the solid catalyst component (W) obtained in (2) at a rate of 6.0 g/hr, triisobutylaluminium (TIBA) at a rate of 0.2 mols/hr, 1-allyl-3,4-dimethoxybenzene (ADMB) at a rate of 0.006 mols/hr, cyclohexylmethyldimethoxysilane (CHMDMS) at a rate of 0.003 mols/hr, and propylene at a rate of 43 kg/hr. In this, the monomer was polymerized at 70° C. and 28 kg/cm$^2$G. The amount of the polymer thus formed was 30 kg/hr.

The polymer had a limiting viscosity [η] (135° C., in decalin) was 5.04 dl/g.

The boiling n-heptane-insoluble content of the polymer was 88.2% by weight. The boiling n-heptane-insoluble component in the polymer had [η] of 5.42 dl/g, and the boiling n-heptane-soluble component therein had [η] of 2.07 dl/g.

On the other hand, the pentad fraction, rrrr/(1-mmmm)×100, of the homopolymer as calculated from its $^{13}$C-NMR spectral pattern was 24.2%; the peak melting temperature (Tm) thereof as measured through DSC was 158.7° C.; and the melting enthalpy (ΔH) thereof was 80.7 J/g. No inverted bonding against the head-tail bonding of the propylene units in the polymer was found.

The powdery polymer obtained herein was mixed with an organic peroxide, 2,5-dimethyl-2,5-di-(t-butylperoxy)-hexane, to which were added 0.02 parts by weight, relative to 100 parts by weight of the powdery polymer, of a phenolic antioxidant, 1,3,5-tris(4-t-butyl-3-hydroxy-2,6-dimethylbenzyl)isocyanurate (Cyanox 1790 from American Cyanamide) and 0.05 parts by weight, relative to the same, of a phosphorus-containing antioxidant, tris(2,4-di-t-butylphenyl) phosphite (Irgafos 168 from Ciba Specialty Chemicals), and mixed. The resulting mixture was extruded through a 40-mmφ die to obtain pellets having a melt index (MI, 230° C., 2.16 kgf) of 2.5 g/10 min.

On the other hand, the polymer was degraded with a peroxide to reduce its molecular weight. There was found no change in the pentad fraction, the peak melting temperature and the melting enthalpy between the original polymer and the degraded, low-molecular-weight polymer. The resin obtained herein had a tensile modulus of 500 MPa.

Production of Polypropylene Resin Composition, and Film Formation:

100 kg of the polypropylene resin produced herein was mixed with 0.2 parts by weight, relative to 100 parts by weight of the resin, of a hindered amine-based light stabilizer, N,N'-bis(aminopropyl)ethylenediamiine/2,4-bis[N-butyl-N-(1,2,2,6,6-pentamethyl-4-piperidyl)amino]-6-chloro-1,3,5-triazine condensate (Chimassorb 119FL from Ciba Specialty Chemicals), and the resulting mixture was molded through a 40-mmφ T-die extruder into film having a thickness of 80 μm or 100 μm.

The film having a thickness of 100 μm was printed through gravure printing, then coated with a polyurethane adhesive (Takelac A-310 from Takeda Chemical Industries), and thereafter laminated with the film having a thickness of 80 μm. Thus were produced surface-protective film samples.

Test of Film for Recyclability and Color Change:

(1) Recyclability of Films:

To evaluate the intrinsic heat resistance of the antioxidants in the films, the melt flow rate (MFR) of the recycled films was measured. The reduction in MFR, if not or little, indicates the practicability of the recycled films.

Briefly, strips of the film to be tested were repeatedly charged into a 40 mmφ, single-screw extruder (die temperature fixed: 280° C.), three times in all. MFR (at 230° C.) of the original film and that of the recycled film were measured, and the ratio, MFR (original)/MFR (recycled) was obtained.

The ratio of smaller than 1.3 means that the recyclability of the film tested is on a practicable level.

(2) Color Change in Films:

This is to evaluate the films for the absence of time-dependent coloration, to which the invention is directed. Briefly, film samples were left in a thermostat at 40° C. for 3 months, and their appearance was visually checked for color change. The film samples after the test were compared with the fresh film samples before the test. The films thus tested were grouped in three ranks, 3, 2 and 1. The test data are shown in Table 1.

Films colored in the test were in Rank 3; those colored but a little were in Rank 2; and those colored little were in Rank 1. Rank 1 and Rank 2 are on an acceptable level.

EXAMPLE 2

The same process as in Example 1 was repeated to prepare a polypropylene resin, a polypropylene resin composition comprising it, and a film of the composition. In this, however, the two antioxidants used in Example 1 were not used, but 0.07 parts by weight of the phenolic antioxidant, 1,3,5-tris(4-t-butyl-3-hydroxy-2,6-dimethylbenzyl) isocyanurate (Cyanox 1790 from American Cyanamide) only was used herein. The film thus produced was tested in the same manner as in Example 1. The test data are shown in Table 1.

EXAMPLE 3

The same process as in Example 1 was repeated to prepare a polypropylene resin, a polypropylene resin composition comprising it, and a film of the composition. In this, however, the phenolic antioxidant of the two antioxidants used in Example 1 was replaced by 3,9-bis[1,1-dimethyl-2-[β-(3-t-butyl-4-hydroxy-5-methylphenyl) propionyloxy] ethyl]-2,4,8,10-tetroxaspiro[5,5]undecane (Sumilizer GA-80 from Sumitomo Chemical). The film thus produced was tested in the same manner as in Example 1. The test data are shown in Table 1.

EXAMPLE 4

The same process as in Example 1 was repeated to prepare a polypropylene resin, a polypropylene resin composition comprising it, and a film of the composition. In this, however, the phenolic antioxidant of the two antioxidants used in Example 1 was replaced by bis(ethyl 3,5-di-t-butyl-4-hydroxybenzylphosphonato) calcium (Irganox 1425WL from Ciba Specialty Chemicals). The film thus produced was tested in the same manner as in Example 1. The test data are shown in Table 1.

COMPARATIVE EXAMPLE 1

The same process as in Example 1 was repeated to prepare a polypropylene resin, a polypropylene resin composition comprising it, and a film of the composition. In this, however, the phenolic antioxidant of the two antioxidants used in Example 1 was replaced by tetrakis[methylene-3-(3,5-di-t-butyl-4-hydroxyphenyl)propionate]methane (Irganox 1010 from Ciba Specialty Chemicals). The film thus produced was tested in the same manner as in Example 1. The test data are shown in Table 1.

COMPARATIVE EXAMPLE 2

The same process as in Example 1 was repeated to prepare a polypropylene resin, a polypropylene resin composition comprising it, and a film of the composition. In this, however, the phenolic antioxidant of the two antioxidants used in Example 1 was replaced by 0.07 parts by weight of tetrakis[methylene-3-(3,5-di-t-butyl-4-hydroxyphenyl) propionate]methane (Irganox 1010 from Ciba Specialty Chemicals), and the phosphorus-containing antioxidant was not added to the composition. The film thus produced was tested in the same manner as in Example 1. The test data are shown in Table 1.

COMPARATIVE EXAMPLE 3

The same process as in Example 1 was repeated to prepare a polypropylene resin, a polypropylene resin composition comprising it, and a film of the composition. In this, however, the two antioxidants used in Example 1 were not used, but 0.07 parts by weight of the phosphorus-containing antioxidant only was added to the composition. The film thus produced was tested in the same manner as in Example 1. The test data are shown in Table 1.

TABLE 1

(unit: parts by weight)

| | Resin | Phenolic Antioxidant | | | | P-containing Antioxidant | Light Stabilizer | Test Results | |
|---|---|---|---|---|---|---|---|---|---|
| | | | | | | | | | Color |
| | 1 | 1 | 2 | 3 | 4 | 1 | 1 | Recyclability | Change |
| Example 1 | 100 | 0.02 | | | | 0.05 | 0.2 | 1.2 | 1 |
| Example 2 | 100 | 0.07 | | | | | 0.2 | 1.2 | 2 |
| Example 3 | 100 | | 0.02 | | | 0.05 | 0.2 | 1.2 | 1 |
| Example 4 | 100 | | | 0.02 | | 0.05 | 0.2 | 1.2 | 1 |
| Comp. Example 1 | 100 | | | | 0.02 | 0.05 | 0.2 | 1.2 | 3 |
| Comp. Example 2 | 100 | | | | 0.07 | | 0.2 | 1.2 | 3 |
| Comp. Example 3 | 100 | | | | | 0.07 | 0.2 | 1.4 | 1 |

Details in Table 1:
Type of Resin:
1: polypropylene resin produced in Example 1
Type of Phenolic Antioxidant:
1: 1,3,5-tris(4-t-butyl-3-hydroxy-2,6-dimethylbenzyl)isocyanurate (Cyanox 1790 from American Cyanamide)
2: 3,9-bis[1,1-dimethyl-2-[β-(3-t-butyl-4-hydroxy-5-mehtylphenyl)propionyloxy]ethyl]-2,4,8,10-tetroxaspiro[5,5]undecane (Sumilizer GA-80 from Sumitomo Chemical)
3: bis(ethyl 3,5-di-t-butyl-4-hydroxybenzyl-phosphonato)calcium (Irganox 1425WL from Ciba Specialty Chemicals)
4: tetrakis[methylene-3-(3,5-di-t-butyl-4-hyroxyphenyl)propionate]methane (Irganox 1010 from Ciba Specialty Chemicals)
Type of Phosphorus-containing antioxidant:
1: tris(2,4-di-t-butylphenyl) phosphite (Irgafos 168 from Ciba Specialty Chemicals)
Type of Light Stabilizer:
1: N,N-bis(aminopropyl)ethylenediamine/2,4-bis[N-butyl-N-(1,2,2,6,6-pentamethyl-4-piperidyl)amino]-6-chloro-1,3,5-triazine condensate (Chimassorb 119FL from Ciba Specialty Chemicals)

As in the test data shown above, it is understood that the films containing both the specific phenolic antioxidant and the specific phosphorus-containing antioxidant (in Examples 1, 3, 4) all had good recyclability and colored little. The film not containing the specific phosphorus-containing antioxidant (in Example 2) colored a little; and the recyclability of the film not containing the specific phenolic antioxidant (in Comparative Example 3) was poor.

While the invention has been described in detail and with reference to specific embodiments thereof, it will be apparent to one skilled in the art that various changes and modifications can be made therein without departing from the spirit and scope thereof.

What is claimed is:

1. A polypropylene resin composition comprising the following components:

(A) 100 parts by weight of a polypropylene resin,
    (B) from 0.001 to 1 part by weight of at least one phenolic antioxidant selected from the group consisting of:
        3,9-bis[1,1-dimethyl-2-[β-(3-t-butyl-4-hydroxy-5-methylphenyl)propionyloxy]ethyl]-2,4,8,10-tetroxaspiro[5,5]undecane,
        triethylene glycol-bis[3-(3-t-butyl-5-methyl-4-hydroxyphenyl)propionate],
        2-t-butyl-4,6-dimethylphenol,
        1,3,5-tris(4-t-butyl-3-hydroxy-2,6-dimethylbenzyl) isocyanurate, and
        bis(ethyl-3,5-di-t-butyl-hydroxybenzylphosphonato) calcium; and
    (C) from 0.05 to 5 parts by weight of a hindered amine-based light stabilizer.

2. A polypropylene resin composition comprising the following components:

(A) 100 parts by weight of a polypropylene resin,
    (B) from 0.001 to 1 part by weight of a mixed antioxidant that comprises (B1) at least one phenolic antioxidant selected from the group consisting of:
        3,9-bis[1,1-dimethyl-2-[β-(3-t-butyl-4-hydroxy-5-methylphenyl)propionyloxy]-ethyl]-2,4,8,10-tetroxaspiro[5,5]undecane,
        triethylene glycol-bis[3-(3-t-butyl-5-methyl-4-hydroxyphenyl) propionate],
        2-t-butyl-4,6-dimethylphenol,
        1,3,5-tris(4-t-butyl-3-hydroxy-2,6-dimethylbenzyl) isocyanurate, and
        bis(ethyl-3,5-di-t-butyl-4-hydroxybenzylphosphonato) calcium; and
    (B2) at least one phosphorus-containing antioxidant selected from the group consisting of:
        tris(2,4-di-t-butylphenyl)phosphite,
        tetrakis(2,4-di-t-butylphenyl)-4,4'-biphenylene diphosphite and
        [bis(2,4-di-tert-butyl-5-methylphenoxy)phosphino] biphenyl, in a ratio by weight, (B1) to (B2), of from 19:1 to 1:19; and
    (C) from 0.05 to 5 parts by weight of a hindered amine-based light stabilizer.

3. The polypropylene resin composition of claim 1, wherein said phenolic antioxidant is 1,3,5-tris(4-t-butyl-3-hydroxy-2,6-dimethylbenzyl)isocyanurate.

4. A polypropylene resin composition comprising the following components:

(A) 100 parts by weight of a polypropylene resin, (B) from 0.001 to 1 part by weight of a mixed antioxidant that comprises (B1) at least one phenolic antioxidant selected from the group consisting of:
3,9-bis[1,1-dimethyl-2-[β-(3-t-butyl-4-hydroxy-5-methylphenyl)propionyl]-ethyl]-2,4,8,10-tetroxaspiro[5,5]undecane,
1,3,5-tris(4-t-butyl-3-hydroxy-2,6-dimethylbenzyl) isocyanurate, and
bis(ethyl-3,5-di-t-butyl-4-hydroxybenzylphosphonato) calcium; and (B2) tris(2,4-di-t-butylphenyl) phosphite, in a ratio by weight, (B1) to (B2), of from 19:1 to 1:19; and (C) from 0.05 to 5 parts by weight of a hindered amine-based light stabilizer.

5. The polypropylene resin composition of claim 1, wherein (C) the hindered amine-based light stabilizer is at least one selected from the group consisting of:
bis-(1,2,2,6,6-pentamethyl-4-piperidyl) 2-(3,5-di-t-butyl-4-hydroxybenzyl)-2-n-butyl malonate,
N,N'-bis(3-aminopropyl)ethylenediamine/2,4-bis[N-butyl-N-(1,2,2,6,6-pentamethyl-4-piperidyl)amino]-6-chloro-1,3,5-triazine condensates,
poly[{6-(1,1,3,3-tetramethylbutyl)amino-1,3,5-triazine-2,4-diyl}{2,2,6,6-tetramethyl-4-piperidyl) imino} hexamethylene {(2,2,6,5-tetramethyl-4-piperidyl)imine}],
bis(1-octyloxy-2,2,6,6-tetramethyl-4-piperidyl) sebacate, and
tetrakis(1,2,2,6,6-pentamethyl-4-piperidyl) 1,2,3,4-butane-tetracarboxylate.

6. The polypropylene resin composition of claim 1, wherein (C) the hindered amine-based light stabilizer is N,N'-bis(3-aminopropyl)ethylenediamine/2,4-bis[N-butyl-N-(1,2,2,6,6-pentamethyl-4-piperidyl)amino]-6-chloro-1,3,5-triazine condensates.

7. The polypropylene resin composition of claim 1, wherein the polypropylene resin satisfies the following requirements:
(i) it has a peak melting temperature (Tm) of 150° C. or above as measured by differential scanning calorimety (DSC), and
(ii) it has a tensile modulus of from 200 to 700 MPa.

8. The polypropylene resin composition as claimed in claim 7, wherein the polypropylene resin comprises the following components:
(a) from 20 to 100% by weight of a propylene homopolymer and/or a propylene copolymer containing at most 4% by weight of other olefin units, the homopolymer and the copolymer satisfying the following requirements:
(iii) said homopolymer and copolymer have a pentad fraction, rrrr/(1-mmmm)×100, as measured by isotopic carbon nuclear magnetic resonance spectrometry ($^{13}$C-NMR) of from 20 to 60%, and
(iv) said homopolymer and copolymer have a melting enthalpy (AH) as measured by differential scanning calorimetry (DSC) of from 10 to 100 J/g, and
(b) from 0 to 80% by weight of a propylene copolymer containing from 10 to 80% by weight of non-propylene olefin units.

9. A film or sheet formed by molding the polypropylene resin composition of claim 1.

10. A surface-protective film or sheet as produced by forming an adhesive layer and/or an ink layer on the film or sheet of claim 9.

11. The polypropylene resin composition of claim 1, wherein said phenolic antioxidant is bis(ethyl-3,5-di-t-butyl-4-hydroxybenzylphosphonato)calcium.

* * * * *